March 28, 1939.    P. E. KÖSTER    2,151,976
INSTRUMENT ARRANGEMENT FOR AIRCRAFT MOTORS
Filed May 15, 1937
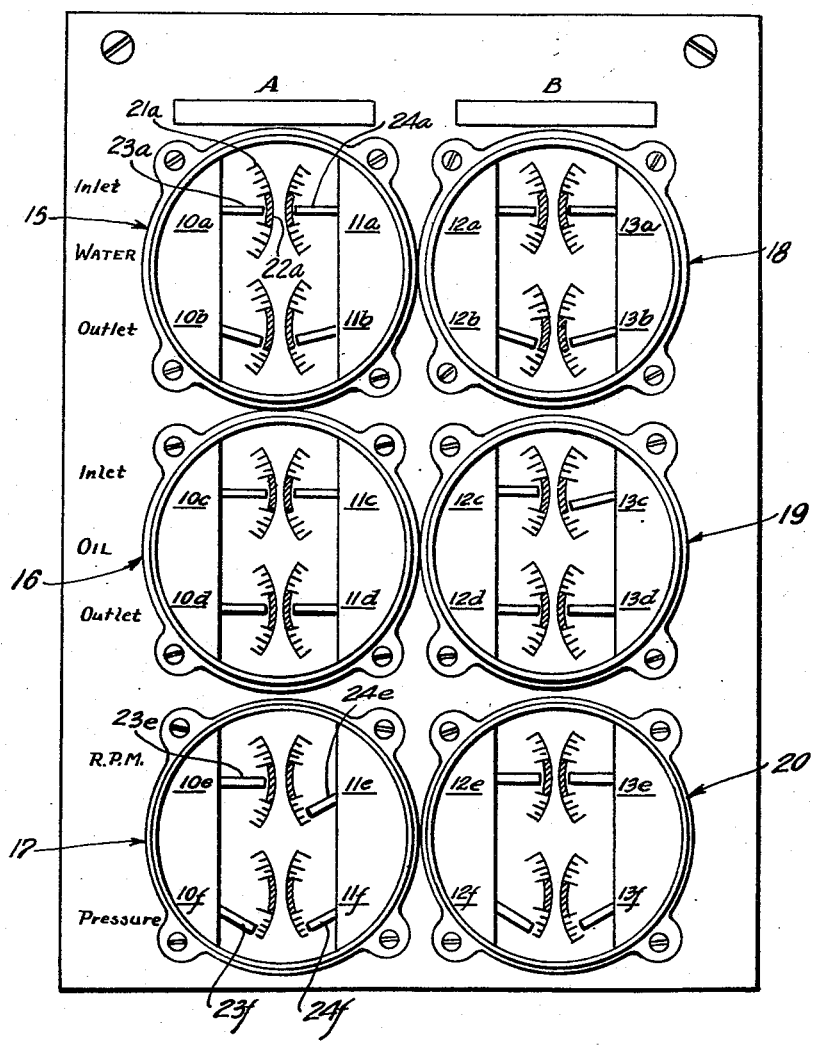
INVENTOR
Paul Eduard Köster
BY Stephen Cerstvik
ATTORNEY Patented Mar. 28, 1939

2,151,976

UNITED STATES PATENT OFFICE 2,151,976

INSTRUMENT ARRANGEMENT FOR AIRCRAFT MOTORS

Paul Eduard Köster, Berlin-Siemensstadt, Germany, assignor to Siemens Apparate und Maschinen Gesellschaft mit beschränkter Haftung, Berlin, Germany, a corporation of Germany Application May 15, 1937, Serial No. 142,750
In Germany May 15, 1936

2 Claims. (Cl. 244—1)

The invention refers to an equipment of the kind as stated in the title and has for its object to produce an instrument board for a craft enabling the pilot to quickly and without much concentration obtain a general view of the operating condition of the driving gears. By driving gears is meant the motors of the craft and the allied appurtenances for motivating the craft.

This object is attained in accordance with the invention by the utilization of indicating or measuring instruments having a plurality of mechanisms such as four measuring works in each casing of one instrument and by arranging the measuring works within the individual measuring instrument and the measuring instruments within the instrument board in such a manner, that (a) The measuring works referring to the same driving gear are placed in a vertical direction one below the other, (b) The groups of measuring works referring to the various driving gears are arranged laterally correct with respect to the driving gears.

In other words, the different factors indicating the operation of one motor appear in vertically aligned indications, while the lateral disposition of the indications of the said factors correspond to the lateral disposition of the motors.

Further, the instruments are so designed that with the normal quantities of the factors to be measured, the pointers of the instruments referring to the same factor are arranged in a straight horizontal line.

The invention consists in accordance therewith of a combination of several features. The advantages of the new instrument board reside in the conspicuous and illustrative representation of the measured factors permitting easy visualization of the status of the devices as a whole.

The clear arrangement and easy grasp of the total panel of the instrument board is augmented by the use of quadruple instruments as they permit reducing the size of the required panel while maintaining the same number of indications. In addition, the employment of the quadruple instruments results in the further advantage of lessening the number of types and reducing the time required for installing and dismantling the measuring instruments.

Further particulars may be noted from the following description of the mode of construction, shown as an example in the drawing, which represents the invention as applied to the driving gear of a four-engined airplane.

In the drawing, wherein like reference characters refer to like parts throughout the several views;

Fig. 1 is a diagrammatic view illustrating the lateral disposition of the motivating mechanisms of a multimotored craft; and Fig. 2 is a view of the indicating mechanisms mounted in an instrument panel.

Referring to the drawing and more particularly to Figure 1, the four motors and appurtenances or driving gears are arranged in the airplane symmetrically to the plane determined by the longitudinal axis and the vertical axis of the airplane, so that there will be two driving gears each at both sides of this symmetrical plane. The two individual motors at the left side—in the direction of flight seen from the pilot—will be designated as 10 and 11, the two on the right side as 12 and 13.

Figure 2 discloses that this fundamental subdivision of the motors into a left and a right hand group is correspondingly applied to the arrangement of the works for the individual driving gears in the instrument board, group A corresponding to the left-hand group of motors and group B to the right hand group.

The group of instruments designated as group A comprises a series of three instruments, 15, 16 and 17, mounted in position on the instrument panel and the group designated as group B comprises a series of three instruments, 18, 19 and 20, similarly arranged.

Instrument 15 comprises a group of four mechanisms comprising a water temperature inlet indicator 10a and an outlet water temperature indicator 10b for indicating the temperatures of motor 10 and an inlet water temperature indicator 11a and an outlet water temperature indicator 11b for indicating the temperatures of motor 11.

Instrument 16 comprises an inlet oil temperature indicator 10c and an outlet oil temperature indicator 10d for motor 10 and a similar group of mechanisms 11c and 11d for motor 11.

Instrument 17 comprises an R. P. M. indicating mechanism 10e and an oil pressure indicator 10f for engine 10 and similar mechanisms 11e and 11f for engine 11.

Instruments 18, 19 and 20 comprise a series of mechanisms for motors 12 and 13 similar to those for motors 10 and 11 as comprised by instruments 15, 16 and 17. The mechanisms of the indicating instruments for each motor are placed in vertical direction below one another, thus forming a vertical individual group. These groups are then arranged laterally in accordance with the disposition of the motors 10, 11, 12 and 13 as shown in Fig. 1. For example, the mechanisms of the instruments corresponding to motor 10, namely, 10a, 10b, 10c, 10d, 10e and 10f, respectively, are vertically arranged, while the mechanisms indicating the same factors for the different motors, such as the inlet water temperature, are arranged laterally in the same order as the motors 10, 11, 12 and 13, namely, 10a, 11a, 12a and 13a.

A further material advantage results from the illustrative subdivision in accordance with the invention of the measuring scale of the individual measuring instrument into a scale range covering the values of the quantity to be measured, permissible in regular service, and into a scale part covering the service-endangering values of the quantities to be measured. These two scale ranges differ in their illustrative character in a manner especially conspicuous to the pilot in optical respect. The part of the scale, covering the values of the quantity to be measured, permissible in regular service, designated as service range, shows the values which, within certain definite limits, may differ from the normal value of the quantity to be measured, in an upward or downward direction without endangering the service thereby. This part of the measuring scale has been made particularly distinguishable and is, for instance, appropriately provided with a luminous coating or layer; the pointers of the measuring instruments are also provided with such coating. The service-endangering values of the quantity to be measured are arranged on the measuring scale above or below this service range. This part is designated as the danger zone. For example, in instrument 15, the scale 21a has a part thereof 22a indicating the normal range of values for the inlet water temperature. Deviations from this part 22a indicate an abnormal value of the factor and pointer indications outside the part 22a serve as a readily visible warning to the pilot.

The pointers of the measuring works occupy a preferred position. For this purpose the zero positions are so chosen, that with normal quantity of the values to be measured the pointers of the measuring instruments referring to the same quantity to be measured lie in a straight line. The measuring works within the individual measuring instrument are so arranged, relatively, that with increasing value of the measured quantity the end of the pointer will move upwards and with decreasing value it will move downwards. For example, the pointers 23a and 24a of instrument 15 lie in the same horizontal line when the inlet water temperature is at the normal value and any deviation of either pointer from this horizontal line is quickly perceived by the pilot. If the measured quantity refers to a position of flight such as the R. P. M. indication, the sense of motion of the pointer is suitably so arranged that the pointers rise or drop in unison with the ascending or descending airplane. For example, the pointers 23e and 24e of instrument 17 will lie in the same horizontal line when the craft is on level flight and the motors 10 and 11 are operating properly. Any deviations from the proper operation will be accompanied by a disalignment of the pointers, as illustrated in Fig. 2, which at once clearly gives a visual indication to the pilot that the operation of a motor is faulty, while uniform movement of both pointers 23e and 24e in the same direction will indicate the attitude of the craft.

This arrangement in accordance with the invention enables the pilot to at any time judge the service condition of the individual driving gears for any desired service quantity much quicker and much more correctly, than it was possible. With these prior art devices a special instrument is used for every measured quantity to be supervised, from which the pilot can read the value of the respective measured quantity by figures and determine thereby, whether the calculated value of the measured quantity is maintained, or whether it is departed from and how large such deviation is. Owing to the fact that in the case of driving gears for aircraft a comparatively large number of quantities to be measured, and in consequence thereof a correspondingly large number of measuring instruments must be supervised and that the attention of the pilot must simultaneously be engaged by the observation of navigation and control apparatus, this kind of supervision is in fact a severe strain on the pilot. These difficulties are aggravated to a large extent in the case of multi-engined airplanes, where the operating condition of every individual driving gear must be supervised in this manner with the aid of numerous measuring works. In such case numerical supervision in accordance with the known equipments referred to above will be extremely difficult, since the quantities to be measured differ not only in their dimensions but also in their numerical value, so that the supervising flight mechanic must commit to memory an enormous number of dimensions and figures for each type of engine and airplane.

As compared with these equipments the arrangement according to the invention of the instruments and the measuring works within the individual measuring instruments ensures reliable supervision, without requiring the reading of any figures, by a purely optical method, without necessitating prior committing to memory of dimensions and figures. This arrangement makes available to the pilot a perfectly clear and unmistakable picture of the operating condition of the individual driving gears, which permits of being judged immediately and at a glance as regards the individual driving gears and the individual measured quantities for such driving gears. The pilot can in this manner ascertain immediately whether the entire operating condition is normal or whether there is any failure and the nature and the extent of such failure.

The various conditions which the instruments can indicate are illustrated in Figure 2. In the first horizontal group 10a, 11a, 12a and 13a the pointers of the four measuring works are in the respective horizontal position corresponding to the normal value of the quantity to be measured, thus indicating a normal operating condition. In the second horizontal group 10b, 11b, 12b and 13b the four pointers indicate a value of the respective quantity to be measured differing from the normal value, but these deviating values are still within the service range defined in the foregoing. Hence this case represents disturbed groups affecting four driving gears, though this does not amount to endangering the service. In the third horizontal group 10c, 11c, 12c and 13c a pointer has wandered from the normal position remaining, however, still within the service range, here we have to deal with an individual fault not endangering the service. In the fourth group, 10d, 11d, 12d and 13d the indications are as in group 1. In the fifth horizontal group 10e, 11e, 12e and 13e pointer 24e is within a scale range indicating service-endangering values. The pilot will recognize immediately in this case a service-endangering individual fault with a driving gear. In the sixth horizontal group 10f, 11f, 12f and 13f the four pointers will be found in the danger zone defined in the foregoing. The pilot will note at once that this indicates a service-endangering group disturbance of the four driving gears.

With night flights this purely optical service supervision will offer a special advantage. The service range and the pointers have been provided, as stated in the foregoing, with a luminous coating or layer. This enables the pilot to readily note, whether the pointers are within the service range or not. He can discern immediately from this whether the service condition of the individual driving gears is in order from a service point of view or whether it is disturbed. A service-endangering fault is indicated as soon as the pointer is found to have moved beyond the service range. Knowledge of the numerical value of such fault is not required in this connection.

The constructional conditions in airplanes make space-saving arrangements imperative also in the instrument board. If an individual instrument is employed for every quantity to be measured, so large a number of measuring instruments as would be required, for instance, in the supervision of driving gears in a four-engined airplane, could be accommodated only with difficulties and great space requirements. Compared with this the use of quadruple instruments means a very considerable saving of space, as in this case four individual measuring works are combined in one single measuring instrument. Since such quadruple measuring instrument may also be made correspondingly lighter than four individual instruments, there can be obtained at the same time considerable saving in weight apart from the saving of space.

The use of quadruple instruments results in a reduction of the number of instruments and types which of course will simplify keeping stock of such instruments.

What is claimed is:

1. In a device of the character described including a plurality of similar indicating devices responsive to change of flight conditions, comprising at least one for each of a plurality of motors, each device being provided with a pointer, said devices being so designed that the pointer indications are aligned at a desired flight condition and said pointers presenting a symmetrical visual indication with change in said flight conditions during similar operation of said motors and said pointers presenting a non-symmetrical visual indication upon deviation of said motors from similar operation.

2. An indicator for multi-motored aircraft including a plurality of indicating mechanisms for indicating operating characteristics of said motors including at least one for each motor said mechanism being aligned in positions corresponding to the positions of said motors, said mechanisms each including a pointer, and said mechanisms being so designed that said pointers assume an aligned position at a desired condition of operation of said motors and said pointers presenting a symmetrical visual indication with similar changes in the condition of operation of said motors and presenting a non-symmetrical visual indication upon deviation therefrom of any one of said motors.

PAUL EDUARD KÖSTER.